(12) United States Patent
Mossman (10) Patent No.: US 12,089,532 B2
(45) Date of Patent: Sep. 17, 2024

(54) REEL FINGER

(71) Applicant: DEERE & COMPANY, Moline, IL (US)

(72) Inventor: Michael W. Mossman, Silvis, IL (US)

(73) Assignee: DEERE & COMPANY, Moline, IL (US)

( * ) Notice: Subject to any disclaimer, the term of this patent is extended or adjusted under 35 U.S.C. 154(b) by 31 days.

(21) Appl. No.: 17/452,990

(22) Filed: Oct. 30, 2021

(65) Prior Publication Data

US 2022/0046860 A1 Feb. 17, 2022

Related U.S. Application Data

(63) Continuation of application No. 16/436,083, filed on Jun. 10, 2019, now Pat. No. 11,178,821.

(51) Int. Cl.
| | |
|---|---|
| *A01D 57/12* | (2006.01) |
| *A01D 43/06* | (2006.01) |
| *A01D 57/02* | (2006.01) |
| *A01D 7/06* | (2006.01) |
| *A01D 65/02* | (2006.01) |
| *A01D 80/02* | (2006.01) |

(52) U.S. Cl.
CPC ............ *A01D 57/12* (2013.01); *A01D 43/06* (2013.01); *A01D 57/02* (2013.01); *A01D 7/06* (2013.01); *A01D 65/02* (2013.01); *A01D 80/02* (2013.01)

(58) Field of Classification Search
CPC ......... A01D 57/02; A01D 57/12; A01D 80/02
See application file for complete search history.

(56) References Cited

U.S. PATENT DOCUMENTS

| | | |
|---|---|---|
| 2,610,460 A | 9/1952 | Hendrickson |
| 3,613,346 A | 10/1971 | Hubbard |
| 3,616,631 A | 11/1971 | Quam |
| 3,785,134 A | 1/1974 | Francis et al. |
| 3,796,030 A | 3/1974 | Neal et al. |
| 3,921,376 A | 11/1975 | Hofer |
| 3,927,512 A | 12/1975 | Molzahn |
| 3,945,180 A | 3/1976 | Sinclair |
| 4,706,448 A * | 11/1987 | Gessel ............... A01D 57/02 56/400 |
| 4,882,899 A | 11/1989 | Jasper et al. |
| 5,463,855 A | 11/1995 | Johnson et al. |
| 6,199,357 B1 | 3/2001 | Bloom |
| 6,910,323 B2 | 6/2005 | Bickel |
| 6,978,589 B2 | 12/2005 | Lanzinger |

(Continued)

FOREIGN PATENT DOCUMENTS

| | | |
|---|---|---|
| CA | 2512114 A1 | 1/2007 |
| CN | 201976462 U | 9/2011 |

(Continued)

*Primary Examiner* — Thomas B Will
*Assistant Examiner* — Madeline I Runco (57) ABSTRACT

A reel for use in an agricultural header has an axis of rotation and comprises a bat and a finger. The bat is mounted to rotate around the axis of rotation to gather crop, and has a non-circular cross-sectional profile. The finger is mounted to the bat to rotate with the bat around the axis of rotation to gather crop. The finger comprises a tine and a clamshell mount to which the tine is coupled and that surrounds the bat to mount the finger to the bat against rotation about the bat.

17 Claims, 5 Drawing Sheets

(56) References Cited

U.S. PATENT DOCUMENTS

| | | |
|---|---|---|
| 7,124,564 B2 | 10/2006 | Glazik et al. |
| 7,124,565 B2 | 10/2006 | Lanzinger |
| 7,650,737 B1 | 1/2010 | Lovett et al. |
| 7,665,287 B2 | 2/2010 | Jones |
| 9,844,183 B2 | 12/2017 | Honey et al. |
| 9,872,435 B2 | 1/2018 | Jasper |
| 10,194,590 B2 | 2/2019 | Honey et al. |
| 10,383,281 B2 | 8/2019 | Jasper |
| 10,440,890 B1 | 10/2019 | Kastning et al. |
| 10,779,471 B2 | 9/2020 | Bongiovanni et al. |
| 2003/0126848 A1 * | 7/2003 | Bickel .................. A01D 57/02 56/220 |
| 2005/0091955 A1 | 5/2005 | Glazik et al. |
| 2007/0289280 A1 | 12/2007 | Marquardt |
| 2014/0260171 A1 | 9/2014 | McGehee et al. |

FOREIGN PATENT DOCUMENTS

| | | |
|---|---|---|
| CN | 203661628 U | 6/2014 |
| CN | 203748272 U | 8/2014 |
| CN | 104509325 A | 4/2015 |
| CN | 107809901 A | 3/2018 |
| DE | 2235606 A1 * | 7/1971 |
| EP | 0347201 A1 | 12/1989 |
| FR | 2147604 A5 | 3/1973 |
| JP | 2011-172535 A | 9/2011 |
| WO | WO2016199068 A1 | 12/2016 |

\* cited by examiner

REEL FINGER

RELATED APPLICATIONS

This is a continuation application of U.S. application Ser. No. 16/436,083, titled REEL FINGER, filed Jun. 10, 2019, which is hereby incorporated by reference in its entirety.

FIELD OF THE DISCLOSURE

The present disclosure relates to a reel for an agricultural header, in particular, to fingers mounted to bats of the reel.

BACKGROUND OF THE DISCLOSURE

There are agricultural headers which may be used with an agricultural harvester to harvest a crop. Such a header may cut, gather, and convey the harvested crop to the harvester as the harvester travels about an agricultural field. The header may have a cutterbar to cut the crop from the field, a reel to gather the cut crop into the header, and a conveyor to convey the cut and gathered crop to an intake for receipt into the harvester.

SUMMARY OF THE DISCLOSURE

According to an aspect of the present disclosure, a reel for use in an agricultural header has an axis of rotation and comprises a bat and a finger. The bat is mounted to rotate around the axis of rotation to gather crop, and has a non-circular cross-sectional profile. The finger is mounted to the bat to rotate with the bat around the axis of rotation to gather crop. The finger comprises a tine and a clamshell mount to which the tine is coupled and that surrounds the bat to mount the finger to the bat against rotation about the bat without additional hardware. The clamshell mount enables the finger to be snapped onto the bat or otherwise readily attached thereto.

The above and other features will become apparent from the following description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
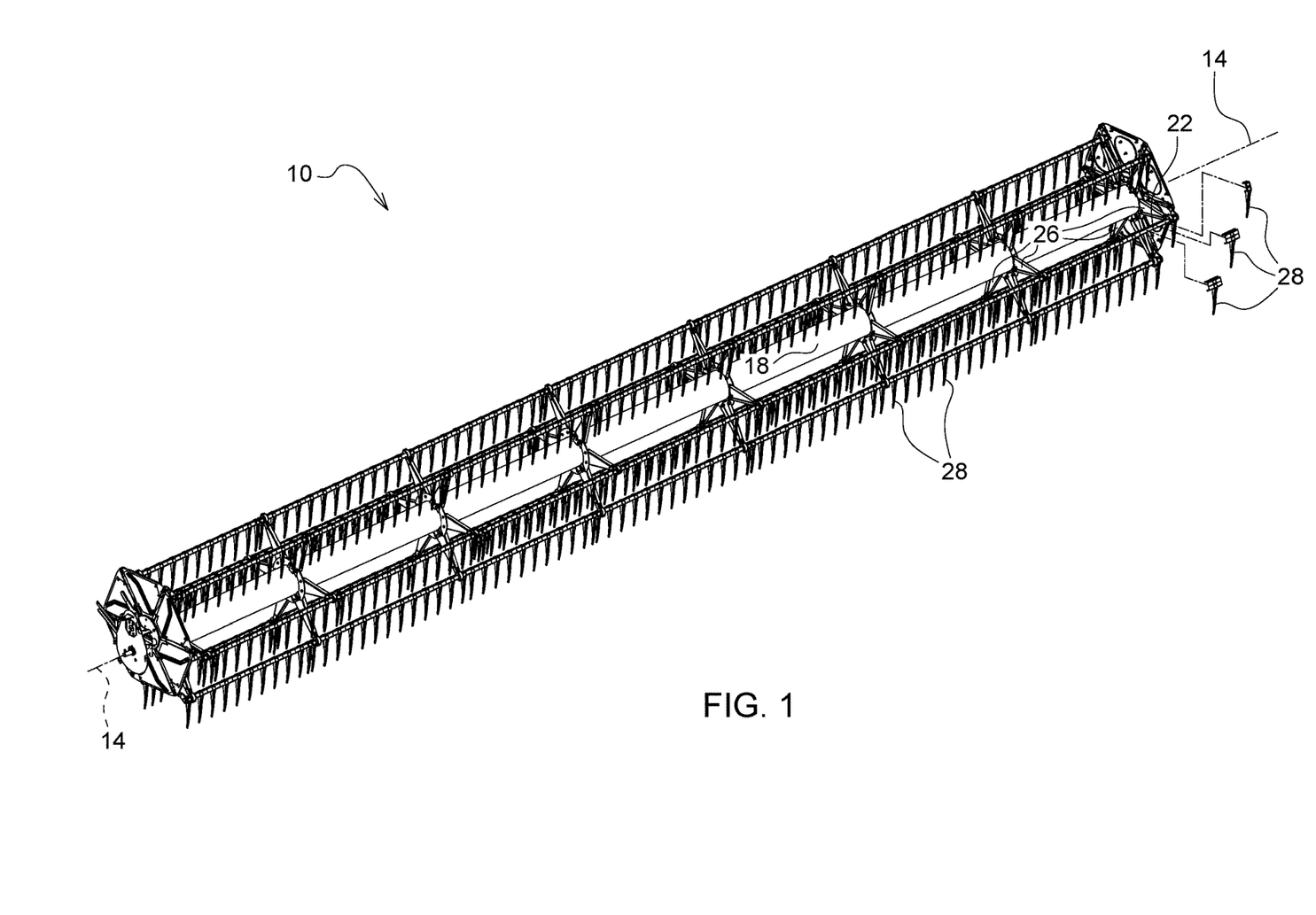
FIG. 1 is a perspective view showing a reel with fingers mounted to bats.

Referring to FIG. 1, there is shown a reel for use in an agricultural header (not shown) according to an embodiment. The header may be used in an agricultural harvester (not shown) to cut, gather, and convey a crop to the harvester as the harvester travels about an agricultural field. The header has a cutterbar that cuts crop from the field, the reel 10 which gathers the cut crop into the header, and a conveyor that conveys the cut and gathered crop to a feederhouse of the harvester for intake into the harvester. The cutterbar may be any suitable cutterbar for cutting a crop from the field (e.g., a reciprocating knife). The conveyor may be any suitable conveyor for conveying the cut and gathered crop to the feederhouse (e.g., auger or draper conveyor).

The reel 10 is provided for use in the header. The reel 10 is rotatably coupled to a frame of the header for rotation of the reel 10 about an axis of rotation 14 of the reel 10. The reel 10 has a hub 18 rotatably coupled to the header frame, bats 22, spokes 26, and fingers 28 which may be provided in multiple embodiments as discussed herein. The spokes 26 respectively interconnect the bats 22 and the hub 18 so as to position the bats 22 radially outwardly from the hub 18 relative to the axis 14 and angularly about the axis 14. The bats 22 are mounted to rotate around the axis 14 to gather the crop into the header.

A plurality of fingers 28 are mounted to each bat 22 to rotate with the bat 22 around the axis 14 to gather crop. The bat 22 has a non-circular cross-sectional profile 29 (FIG. 4).

Figure 2:
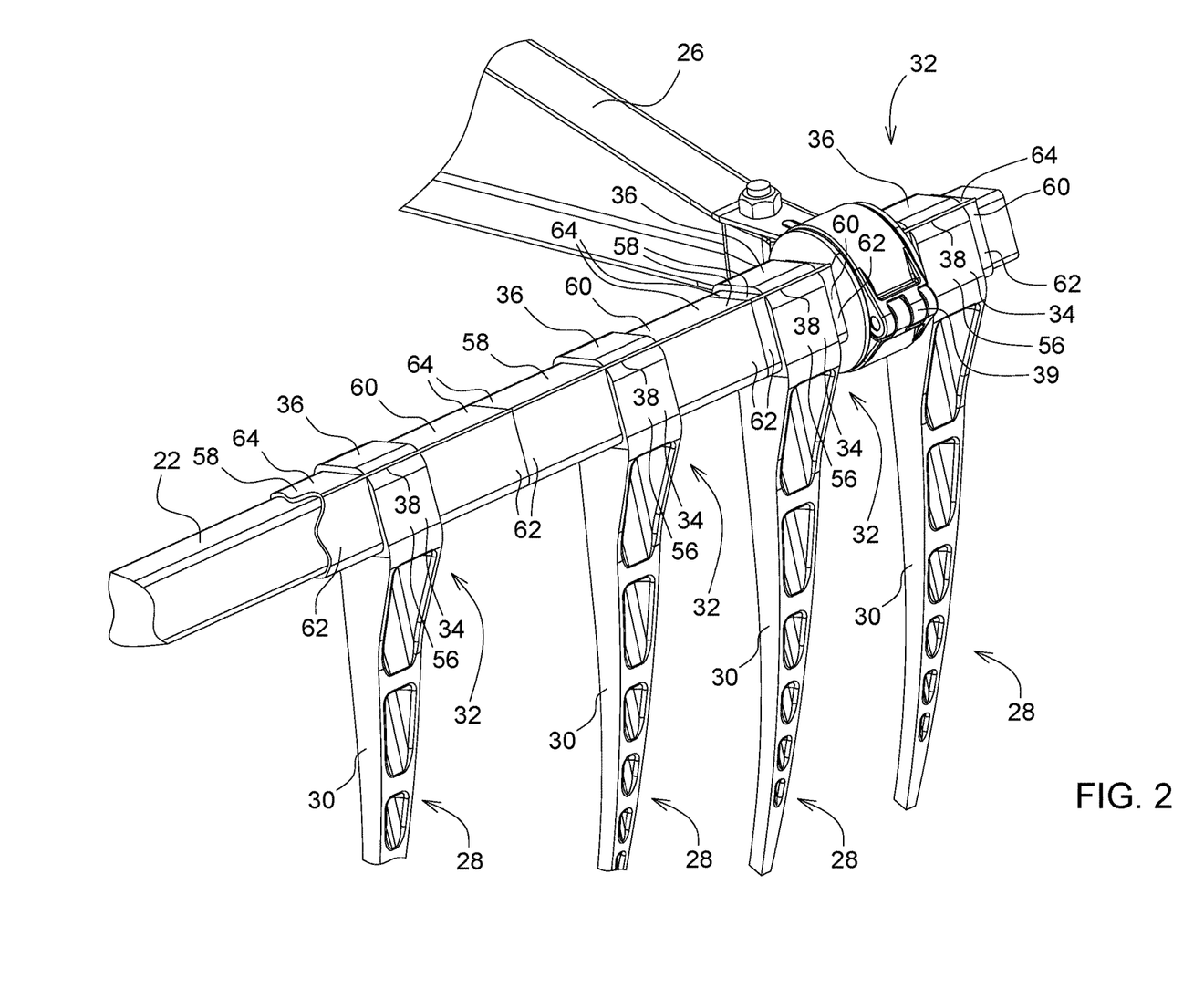
FIG. 2 is an enlarged perspective view showing fingers mounted to a bat.
Figure 3:
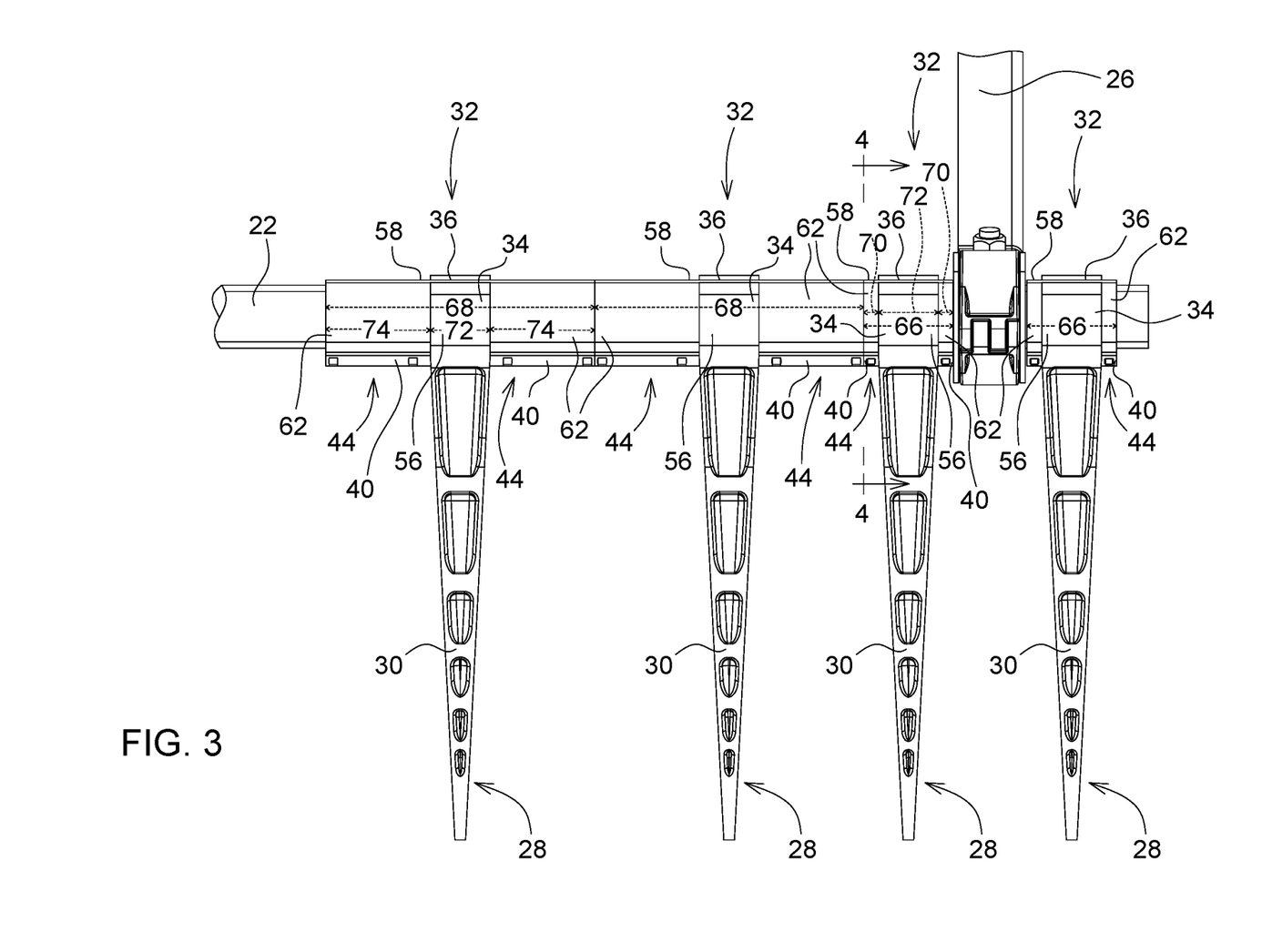
FIG. 3 is a front elevational view showing fingers mounted to a bat.
Figure 4:
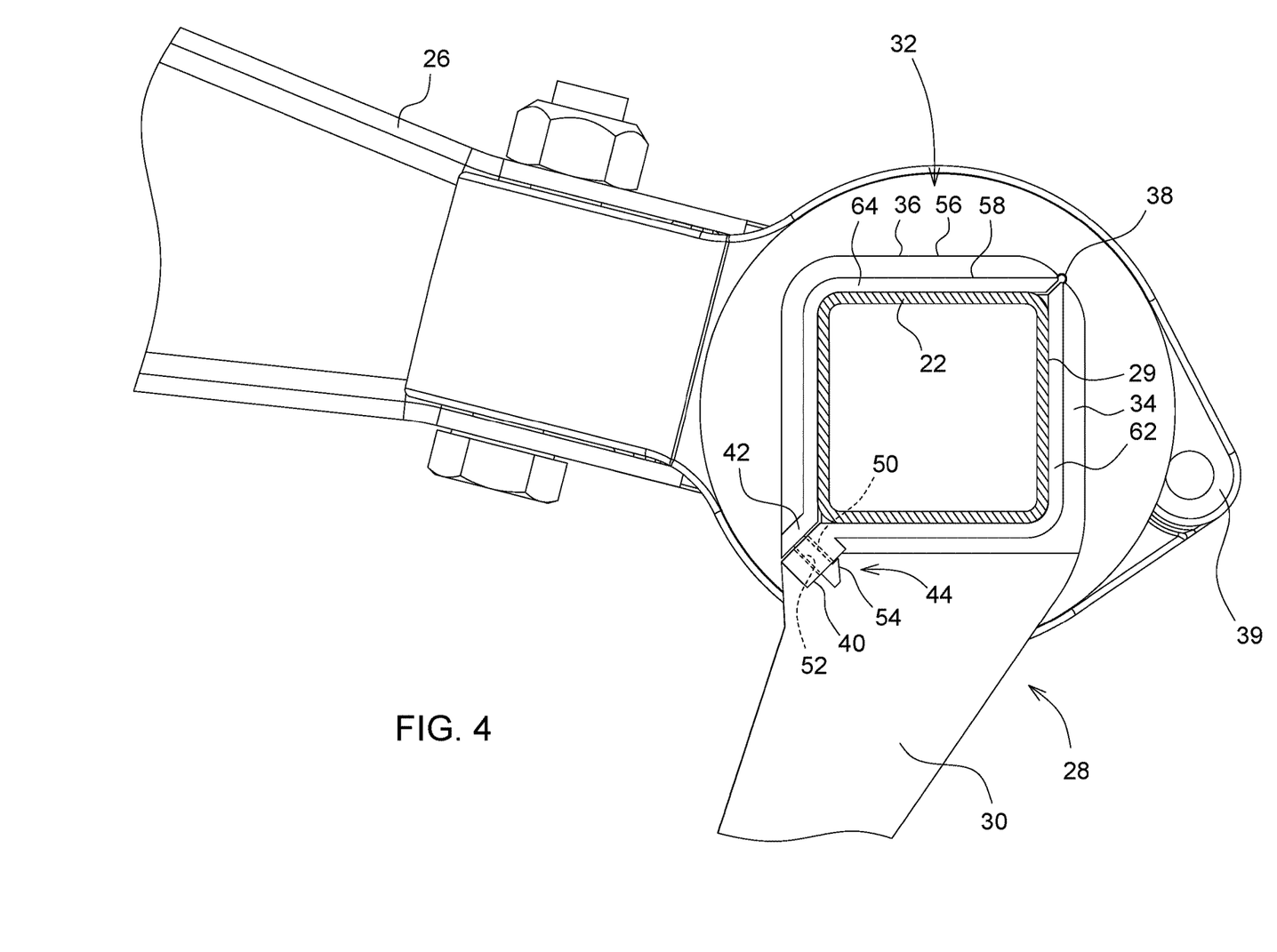
FIG. 4 is a sectional view, taken along lines 4-4 of FIG. 3.

Referring to FIGS. 2-4, each finger 28 is configured in a manner to mount the finger 28 to the bat 22 against rotation about the bat 22 without additional hardware. The finger 28 includes a tine 30 and a clamshell mount 32. The tine 30 is coupled to the clamshell mount 32. The clamshell mount 32 surrounds the bat 22 to mount the finger 28 to the bat 22 against rotation about the bat 22 without additional hardware.

The clamshell mount 32 includes a first jaw 34 to which the tine 30 is coupled, a second jaw 36, and a hinge 38 interconnecting the first jaw 34 and the second jaw 36 for relative movement of the first and second jaws 34, 36 between an open, unlocked position of the clamshell mount 32 (FIGS. 5 and 6) and a closed, locked position of the clamshell mount 32 (FIGS. 2-4). Illustratively, the hinge 38 is a living hinge. In other embodiments, the hinge 38 may be a pinned joint, similar to the pinned mechanical hinge of a spoke anchor 39 of a spoke 26.

Figure 5:
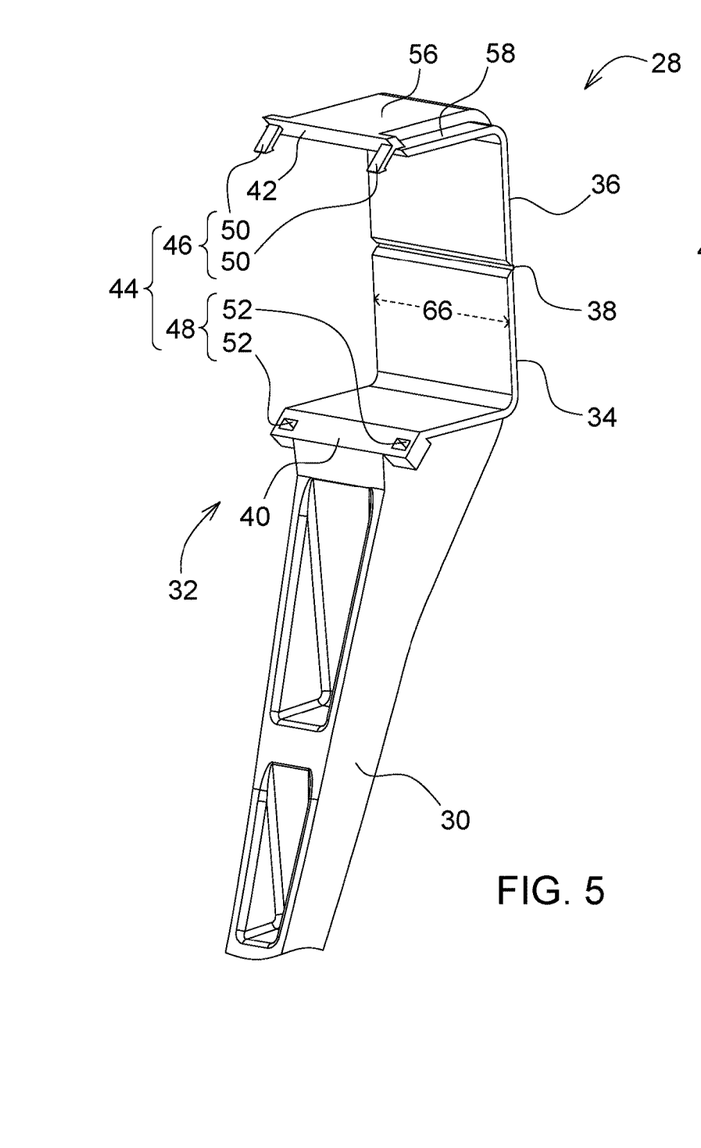
FIG. 5 is a perspective view showing the finger with a clamshell mount according to a first embodiment having a relatively narrow lateral width.
Figure 6:
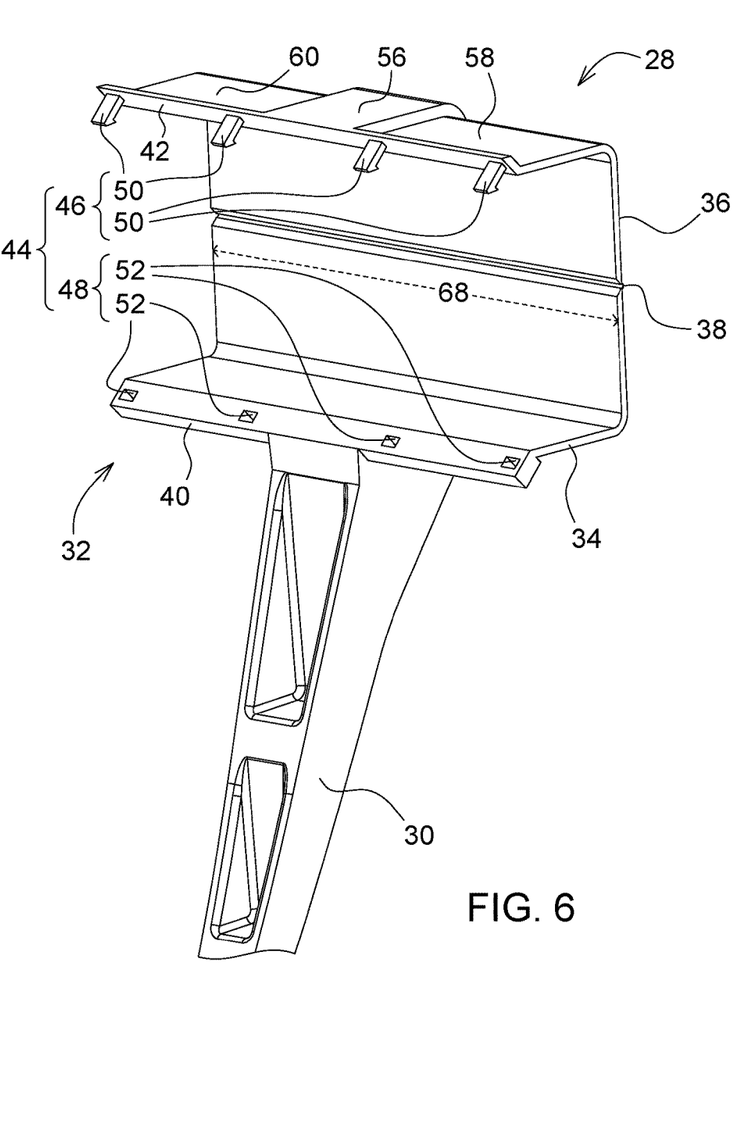
FIG. 6 is a perspective view showing the finger with a clamshell mount according to a second embodiment having a relatively wide lateral width.

Referring to FIGS. 4-6, the first and second jaws 34, 36 have respective distal end portions 40, 42 relative to the hinge 38. The distal end portion 42 of the second jaw 36 is coupled to a portion of the finger 28 in the closed, locked position and separated from that portion in the open, unlocked position. Illustratively (FIG. 4), the distal end portions 40, 42 are coupled to one another in the closed, locked position and separated from one another in the open, unlocked position (FIGS. 5 and 6).

The clamshell mount 32 has a lock 44 that holds the clamshell mount 32 on the bat 22 in the closed, locked position. A tab structure 46 of the lock 44 is coupled to a tab receiver 48 of the lock 44 in the closed, locked position and uncoupled from the tab receiver 48 in the open, unlocked position. The tab structure 46 includes one or more tabs 50, and the tab receiver 48 includes one or more apertures 52. The one or more apertures 52 receive respectively the one or more tabs 50 in the closed, locked position. Each tab 50 has a barb 54 that couples to the respective aperture 52 to lock the tab 50 thereto, and can be deflected relative to the aperture 52 to retract the tab 50 therefrom.

The distal end portion 40 of the first jaw 34 or the distal end portion 42 of the second jaw 36 includes the one or more tabs 50, and the other of the distal end portion 40 of the first jaw 34 or the distal end portion 42 of the second jaw 36 includes the one or more apertures 52 receiving respectively the one or more tabs 50 in the closed, locked position. Illustratively, the distal end portion 40 of the first jaw 34 includes the one or more apertures 52, and the distal end portion 42 of the second jaw 36 includes the one or more tabs 50. In a first embodiment of the clamshell mount 32 (FIG. 5), the distal end portion 40 of the first jaw 34 includes two apertures 52 spaced laterally apart from one another (the lateral dimension is parallel to the axis 14), and the distal end portion 42 of the second jaw 36 includes two tabs 50 spaced laterally apart from one another. In a second embodiment of the clamshell mount 32 (FIG. 6), the distal end portion 40 of the first jaw 34 includes four apertures 52 spaced laterally apart from one another, and the distal end portion 42 of the second jaw 36 includes four tabs 50 spaced laterally apart from one another.

Referring to FIG. 4, the bat 22 and the clamshell mount 32 are configured for mounting the finger 28 to the bat 22 against rotation about the bat 22 without additional hardware. The bat 22 has a non-circular cross-sectional profile 29. Illustratively, the bat 22 is tubular, and the profile 29 is generally square. In other non-limiting embodiments, the cross-sectional profile 29 may be, for example, rectangular, oval, or circular except with a notch formed in the periphery. The bat 22 may be made of a standard mill stock tube (in such a case a factory fixture may be used to ensure proper orientation of the finger 28 relative to the bat 22 during initial assembly). The jaws 34, 36 of the clamshell mount 32 generally match the shape of the profile 29. Illustratively, each jaw 34, 36 is generally V-shaped matching the shape of the corresponding portion of the bat profile 29. The jaws 34, 36 may be configured in other ways to match the shape of the bat profile 29. No additional hardware, whether in the form of bolts, screws, nuts, clips, or otherwise, is needed to mount the finger 28 to the bat 22, and there is no need to drill hole in the bat 22 to attach the finger 28. Although FIG. 4 shows the side elevational view of the finger 28 with the first embodiment of the clamshell mount 32, that side elevational view is also representative of the side elevational view of the finger 28 with the second embodiment of the clamshell mount 32.

Referring to FIGS. 2-4, the clamshell mount 32 includes a spine 56, a first spacer wing 58, and a second spacer wing 60. The tine 30 is coupled to the spine 56 so as to be appended thereto. The spacer wings 58, 60 may be used to establish proper spacing between adjacent fingers 28. The spine 56 is raised in relief relative to the spacer wings 58, 60 so as to be reinforced to support the tine 30. The spine 56 is positioned laterally between the first spacer wing 58 and the second spacer wing 60 such that the first and second spacer wings 58, 60 extend laterally from the spine 56 in laterally opposite directions away from the tine 30 along the bat 22. The spacer wings 58, 60 includes the tabs 50 and apertures 52.

The first jaw 34, the second jaw 36, and the hinge 38 cooperate to provide the spine 56, the first spacer wing 58, and the second spacer wing 60. The first jaw 34 includes a first wing portion 62 of the first spacer wing 58 and a first wing portion 62 of the second spacer wing 60. The second jaw 36 includes a second wing portion 64 of the first spacer wing 58 and a second wing portion 64 of the second spacer wing 60.

The first wing portion 62 of each spacer wing 58, 60 includes one or more tabs 50 or apertures 52 at the distal end portion 40 of the first jaw 34, and the second wing portion 64 of each spacer wing 58, 60 includes one or more of the other of the tabs 50 or apertures 52 at the distal end portion 42 of the second jaw 36. In the first embodiment of the clamshell mount 32 (FIG. 5), the first wing portion 62 of each spacer wing 58, 60 includes one aperture 52 at the distal end portion 40 of the first jaw 34, and the second wing portion 64 of each spacer wing 58, 60 includes one tab 50 at the distal end portion 42 of the second jaw 36. In the second embodiment of the clamshell mount 32 (FIG. 6), the first wing portion 62 of each spacer wing 58, 60 includes two apertures 52 at the distal end portion 40 of the first jaw 34, and the second wing portion 64 of each spacer wing 58, 60 includes two tabs 50 at the distal end portion 42 of the second jaw 36.

Referring to FIG. 3, the clamshell mounts 32 of adjacent fingers 28 establish proper spacing between the tines 30 of those adjacent fingers 28. The clamshell mounts 32 of those fingers 28 abut one another. The spacer wings 58, 60 of those fingers 28 abut one another to establish the spacing between their tines 30. The first spacer wing 58 of one finger 28 and the second spacer wing 60 of the other finger 28 abut one another to establish the tine spacing. The spacer wings 58, 60 of a finger 28 may also help establish spacing of the tine 30 of the finger 28 with other adjacent components (e.g., an adjacent spoke 26).

As alluded to herein, the clamshell mount 32 may come in different lateral widths. For example, in the first embodiment of the clamshell mount 32 (FIGS. 3 and 5), the clamshell mount 32 has a relatively narrow, first lateral width 66, whereas, in the second embodiment of the clamshell mount 32 (FIGS. 3 and 6), the clamshell mount 32 has a relatively wide, second lateral width 68, with the second lateral width 68 larger than the first lateral width 66. In the first embodiment of the clamshell mount 32, the finger 28 has narrower spacer wings 58, 60, with each spacer wing 58, 60 having a lateral width 70 smaller than a lateral width 72 of the spine 56 and the tine 30 appended thereto. In the second embodiment of the clamshell mount 32, the finger 28 has wider spacer wings 58, 60, with each spacer wing 58, 60 having a lateral width 74 larger than the width 72 of the spine 56 and the tine 30 appended thereto. The tines 30 are the same size (including lateral width).

The reel 10 can be constructed to include one or more fingers 28 with the narrower clamshell mounts 32 and fingers 28 with the wider clamshell mounts 32. The two embodiments may be selectively arranged on the bats 22 for specific conditions. In either embodiment, in the case where the hinge 38 is a living hinge, the finger 28 may be a one-piece injection-molded plastic part. In the case where the hinge 38 is a pinned joint, the finger 28 may include a two-piece construction of injection-molded plastic coupled together by the hinged joint. Such fingers 28 of the reel 10 may help reduce the cost of manufacturing reels. Spacing between adjacent fingers 28 is thus controlled by the width of the clamshell mounts 32, such that, as a finger 28 is installed, it is slid to, or otherwise positioned by, the adjacent finger 28 to establish the spacing.

While the above describes example embodiments of the present disclosure, these descriptions should not be viewed in a limiting sense. Rather, other variations and modifications may be made without departing from the scope and spirit of the present disclosure as defined in the appended claims.

What is claimed is:
1. A reel for use in an agricultural header, the reel having an axis of rotation, the reel comprising:
   a bat mounted to rotate around the axis of rotation to gather crop, the bat having a non-circular cross-sectional profile, and a finger mounted to the bat to rotate with the bat around the axis of rotation to gather crop, the finger comprising a tine and a clamshell mount to which the tine is coupled and that comprises:
  a spine to which the tine is coupled;
  a first spacer wing extending laterally from the spine away from the tine along the bat in a first lateral direction, the first spacer wing forming a first outboard end without another tine; and
  a second spacer wing extending laterally from the spine away from the tine along the bat in a second lateral direction opposite the first lateral direction, with the spine positioned between the first spacer wing and the second spacer wing, the second spacer wing forming a second outboard end without another tine;
wherein the spine, the first spacer wing, and the second spacer wing surround the bat to mount the finger to the bat against rotation about the bat without additional hardware;
wherein the first spacer wing of the clamshell mount comprises a lock that holds the clamshell mount on the bat.

2. The reel of claim 1, wherein the clamshell mount comprises a first jaw to which the tine is coupled, a second jaw, and a hinge interconnecting the first jaw and the second jaw for relative movement of the first and second jaws between an open, unlocked position of the clamshell mount and a closed, locked position of the clamshell mount, and the first jaw, the second jaw, and the hinge cooperate to provide the spine and the first spacer wing.

3. The reel of claim 2, wherein each of the first jaw and the second jaw comprises a distal end portion relative to the hinge, the distal end portions of the first and second jaws are coupled to one another in the closed, locked position and separated from one another in the open, unlocked position.

4. The reel of claim 3, wherein the distal end portion of the first jaw or the second jaw comprises a tab positioned on the first spacer wing, and the distal end portion of the other of the first jaw or the second jaw comprises an aperture receiving the tab positioned on the first spacer wing in the closed, locked position.

5. The reel of claim 3, wherein the bat includes multiple corners, the distal end portions of the first and second jaws are coupled to one another in the closed, locked position corresponding to one of the multiple corners, and the distal end portions of the first and second jaws are separated from one another in the open, unlocked position corresponding to the one of the multiple corners.

6. The reel of claim 2, wherein the second jaw comprises a distal end portion relative to the hinge, and the distal end portion is coupled to a portion of the finger in the closed, locked position and separated from the portion of the finger in the open, unlocked position.

7. The reel of claim 2, wherein the hinge is a living hinge.

8. The reel of claim 2, wherein an interior polygonal cross-sectional profile of the clamshell mount includes multiple corners, and the hinge of the clamshell is positioned at one of the corners.

9. The reel of claim 2, wherein the hinge interconnecting the first spacer wing of the first jaw and the first spacer wing of the second jaw for relative movement of the spacer wings of the first and second jaws between an open, unlocked position of the clamshell mount and a closed, locked position of the clamshell mount.

10. The reel of claim 1, wherein the lock comprises a tab structure and a tab receiver, and the tab structure is coupled to the tab receiver.

11. The reel of claim 10, wherein the tab structure comprises a tab, and the tab receiver comprises an aperture receiving the tab.

12. The reel of claim 1, wherein the spine and the first spacer wing are configured to move together between the open, unlocked position of the clamshell mount and the closed, locked position of the clamshell mount.

13. The reel of claim 12, wherein the clamshell mount of the finger comprises a first jaw, a second jaw, and a hinge interconnecting the first jaw and the second jaw for relative movement of the first and second jaws between an open, unlocked position of the clamshell mount and a closed, locked position of the clamshell mount, the first jaw, the second jaw, and the hinge cooperate to provide the spine and the first spacer wing, and the first jaw comprises a first wing portion of the first spacer wing, the second jaw comprises a second wing portion of the first spacer wing.

14. The reel of claim 13, wherein the first wing portion comprises a tab or aperture at a distal end portion of the first jaw relative to the hinge, the second wing portion comprises the other of the tab or aperture at a distal end portion of the second jaw relative to the hinge, and the aperture receives the tab in the closed, locked position.

15. The reel of claim 1, comprising a second finger adjacent to the finger and mounted to the bat to rotate with the bat around the axis of rotation to gather crop, the second finger comprising a second tine and a second clamshell mount to which the second tine is coupled and that comprises a second spine to which the second tine is coupled, a first spacer wing of the second clamshell mount extending laterally from the second spine away from the second tine along the bat, and a second spacer wing of the second clamshell mount, wherein the second spine is positioned laterally between the first spacer wing of the second clamshell mount and the second spacer wing of the second clamshell mount such that the first and second spacer wings of the second clamshell mount extend laterally from the spine in laterally opposite directions away from the tine along the bat, and the first spacer wing of the clamshell mount of the finger abuts the second spacer wing of the second clamshell mount of the second finger.

16. A finger for use with a reel in an agricultural header, the reel comprising a bat mounted to rotate around an axis of rotation of the reel to gather crop, the bat having a non-circular cross-sectional profile, the finger configured to mount to the bat to rotate with the bat around the axis of rotation to gather crop, the finger comprising:
  a tine, and
  a clamshell mount to which the tine is coupled and that comprises:
    a spine to which the tine is coupled;
    a first spacer wing extending laterally from the spine away from the tine along the bat in a first lateral direction, the first spacer wing forming a first outboard end without another tine; and
    a second spacer wing extending laterally from the spine away from the tine along the bat in a second lateral direction opposite the first lateral direction, with the spine positioned between the first spacer wing and the second spacer wing, the second spacer wing forming a second outboard end without another tine;
  wherein the spine, the first spacer wing, and the second spacer wing surround the bat to mount the finger to the bat against rotation about the bat without additional hardware;

wherein the first spacer wing of the clamshell mount comprises a lock that holds the clamshell mount on the bat.

17. A reel for use in an agricultural header, the reel having an axis of rotation, the reel comprising:
   a bat mounted to rotate around the axis of rotation to gather crop, and
   a finger mounted to the bat to rotate with the bat around the axis of rotation to gather crop, the finger comprising a tine and a clamshell mount to which the tine is coupled and that comprises:
      a spine to which the tine is coupled;
      a spacer wing of the finger extending laterally from the spine away from the tine along the bat in a first lateral direction, surrounding the bat, and forming a first outboard end without another tine;
   a second finger mounted to the bat to rotate with the bat around the axis of rotation to gather crop, the second finger comprising a second tine and a second clamshell mount to which the second tine is coupled and that comprises:
      a second spine to which the second tine is coupled;
      a spacer wing of the second finger extending laterally from the second spine away from the second tine along the bat in a second lateral direction opposite the first lateral direction, surrounding the bat, and forming a third outboard end without another tine; and
   wherein the finger and the second finger are mounted to the bat as separate pieces, the first outboard end of the spacer wing of the finger abuts the third outboard end of the spacer wing of the second finger, and a lateral width of the spacer wing at least partially defines the distance between the tine of the finger and the second tine of the second finger;
   wherein the spacer wing of the clamshell mount comprises a lock that holds the clamshell mount on the bat.

* * * * *